Aug. 10, 1965     G. D. MYLCHREEST     3,199,986
METHOD OF RESISTANCE HEATING RAW MEAT EMULSION
BY THE USE OF A SILVER-NICKEL ELECTRODE
Filed Dec. 8, 1961     2 Sheets-Sheet 2
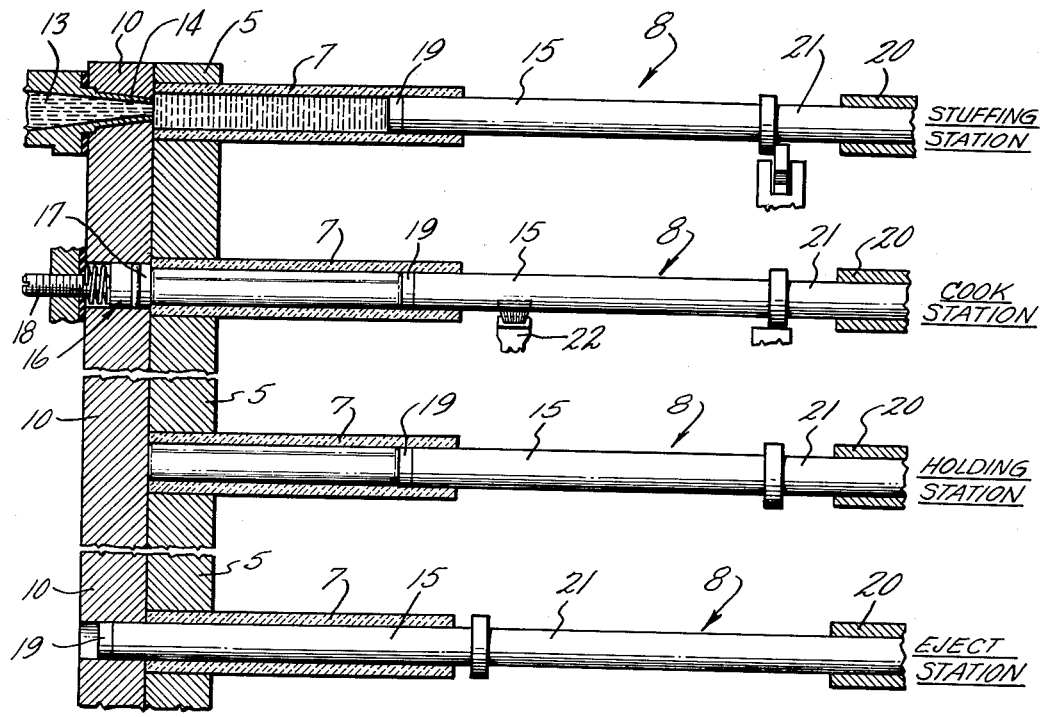
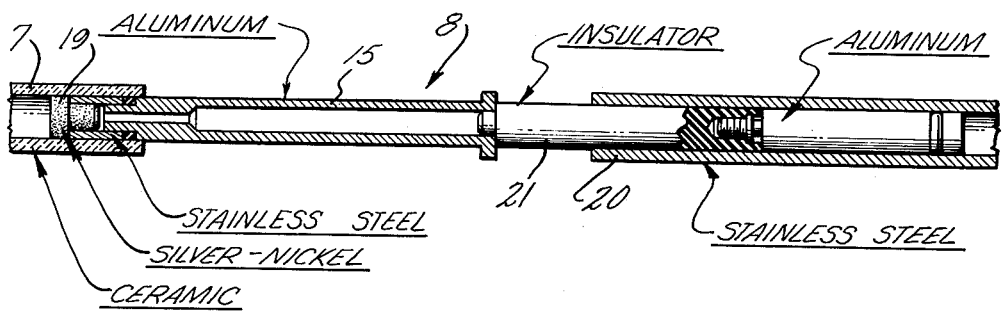
INVENTOR
GEORGE D. MYLCHREEST
BY Burns, Doane, Benedict,
Swecker & Mathis
ATTORNEYS

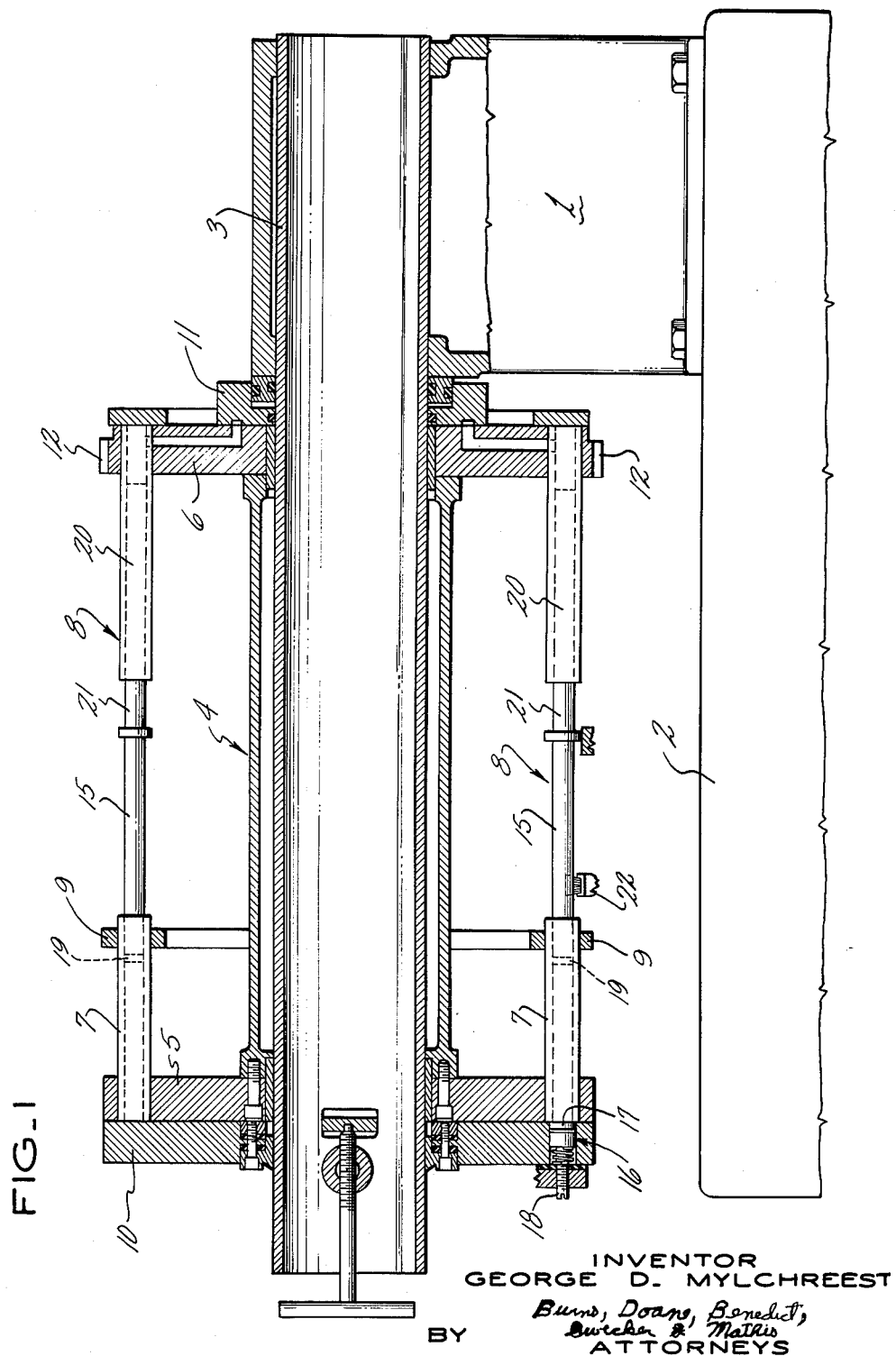

United States Patent Office 3,199,986
Patented Aug. 10, 1965

3,199,986
METHOD OF RESISTANCE HEATING RAW MEAT EMULSION BY THE USE OF A SILVER-NICKEL ELECTRODE
George D. Mylchreest, Hartford, Conn., assignor to Emhart Corporation, Bloomfield, Conn., a corporation of Connecticut
Filed Dec. 8, 1961, Ser. No. 157,942
1 Claim. (Cl. 99—109)

This invention relates to an electrode composition, and more particular, to a composition for electrodes for resistive heating of food products.

In the production of certain processed meat products, such as frankfurters, it is necessary to cook raw meat emulsion in a mold to congeal the meat into the desired shape. In order to meet the high production rate required to produce frankfurters economically, high speed machines have been developed for injecting the raw emulsion into a mold and heating it extremely rapidly with a high voltage current which surges through the emulsion. Resistive heating of the emulsion by an electric current has been found to be the quickest and most practical method.

Ordinarily, the electrodes are positioned at opposite ends of the mold and when the mold is filled with emulsion, a high voltage electric current is caused to flow between the electrodes. As the current flows through the emulsion, the temperature of the emulsion rises. The duration of the flow of current is usually less than one second. During the heating cycle, the electrodes contact the emulsion and often a visible contamination is formed on the ends of the frankfurter by the electrode. This visible discoloration makes the frankfurter unacceptable.

Another difficulty is that the electrodes tend to arc so that the current does not produce sufficient heat to cook the emulsion, or the frankfurter is not cooked uniformly. There are materials which are known to have a minimum tendency to arc, such as silver and graphite, but these materials are unsatisfactory since they produce visible contamination.

In a high production rate frankfurter machine, the electrodes are subject to conditions resulting in mechanical wear and electrolytic erosion. The electrode composition must withstand the wear and yet be porous enough to provide good electrical contact with the emulsion.

Accordingly, it is an object of this invention to provide an electrode which has a minimum tendency to arc.

It is a further object of this invention to provide an electrode which produces no visible contamination on meat products which are heated by the electrodes.

It is another object of this invention to provide a composition for electrodes which has high mechanical strength and is resistant to abrasion for use in high speed food cooking machinery.

In accordance with a preferred embodiment of this invention, the electrodes are formed out of a sintered nickel-silver compact containing a relatively small amount of silver. This electrode composition has a low arcing tendency and produces no visible contamination on meat products.

This preferred embodiment of the invention is illustrated in the accompanying drawings as it is used in high speed frankfurter production machinery, in which:

FIGURE 1 is a cross-sectional view of a turret type automatic frankfurter production machine.

FIGURE 2 is an enlarged cross-sectional view showing the principal operating stations which are provided around the circumference of the turret; and FIGURE 3 is a cross-sectional view of a plunger and its electrode.

There are several types of high speed frankfurter production machines employing high voltage electric current to heat or cook frankfurters. One type is illustrated in FIGURE 1. It is a turret type machine having a supporting post 1 which is mounted on a machine base 2 and which supports a stationary cantilever tube 3. A cylindrical turret 4 is journalled in bearings to rotate about the tube 3. The turret 4 is provided with circular plates 5 and 6 at opposite ends between which a plurality of molds 7 and plunger assemblies 8 are mounted. The molds and plunger assemblies are equally spaced around the circumference of the plates 5 and 6 of the turret 4. A spacer 9 provides additional support for the molds 7.

A stationary face plate 10 is secured to the tube 3 and cooperates with the turret plate 5. At the opposite end of the turret, a valve plate 11 is secured to the tube 3 and cooperates with the turret plate 6. The turret 4 is caused to rotate by a ring gear 12 on the periphery of the plate 6. As the turret rotates, the molds 7 and plunger assemblies 8 move past successive operating stations which are mounted in the face plate 10. A cook station and a holding station are illustrated in cross-section in FIGURE 1.

A simplified cooking cycle is illustrated in FIGURE 2. The stuffing station is the first station in the cycle. Cold meat emulsion 13 is injected through a nozzle 14 which is mounted in the face plate 10. The emulsion enters the mold 7, forcing the plunger 15 of the plunger assembly 8 to retract. When the mold has been filled, the turret is indexed by the ring gear 12 and each mold 7 moves to the next station. The mold containing the cold emulsion indexes to the cook station. A stationary electrode assembly 16 is mounted in the face plate 10 and a sintered disc electrode element 17 is secured to the electrode assembly 16. By means of an adjusting screw 18, the position of the electrode 17 is adjusted so that its outer surface lies in the plane of the inner surface of the face plate 10.

The plunger 15, as shown in FIGURE 3, is a metal tube which telescopes within the mold 7. A sintered electrode 19 is secured to the end of the plunger 15 and is in contact with the emulsion in the mold. The plunger 15 is insulated from its supporting tube 20 by an insulator bar 21. While the mold is in the cook station, a surge of high voltage current is applied between the electrodes 17 and 19. The current is conducted to the plunger electrode 19 by a brush contact 22 which engages the metal plunger 15. The electrical current is turned on for only a fraction of a second, but it heats the frankfurter fully to an internal temperature of more than 160° F. The heated frankfurter is indexed through a series of holding stations and finally ejected through an aperture in the face plate 10.

It will be appreciated that high speed operation of the turret imposes mechanical wearing conditions on the surfaces of the electrodes. Since the stationary electrode 17 is adjusted to lie in the plane of the inner surface of the face plate 10, it is subject to abrasion during each indexing movement of the turret. The plunger electrode 19 is also subjected to abrasion during its reciprocating movement in the mold during the stuffing operation and the eject operation. Further, electrolytic decomposition consumes the operating face of the electrodes. It has been found that a sintered compact of silver-nickel has adequate resistance to wear under these severe surface conditions.

Considerable difficulty was encountered in obtaining satisfactory cooking conditions in the mold. Due to the short cooking time available, it is necessary that high current levels be used at high voltages. Consequently, there is a tendency for arcing to occur, resulting in a product which is burned at one end, but insufficiently cooked otherwise. The arcing may occur at the interface of either electrode and the emulsion in the mold.

The tendency for arcing to occur depends both on the characteristics of the particular emulsion and on the electrode material. Graphite electrodes, silver electrodes and electrodes of graphite impregnated with silver are representative of electrodes having a minimum tendency to arc, but these almost always produce at least a small amount of visible discoloration on the frankfurters. This discoloration is usually in the form of dark spots on the ends of the cooked frankfurters. Pure nickel produces no visible contamination, but generally does produce arcing. It has been found that a sintered silver-nickel compact containing a relatively small amount of silver makes an electrode having the desired characteristics of low arcing tendency and no visible contamination. This result is somewhat unexpected in that, from metallic electrodes, better results had previously been obtained with pure metals. The use of alloys as a rule results in more visible contamination.

The porosity of the sintered material enhances the effective emulsion-electrode interface area, which may be a factor in reducing arcing.

Compositions of five percent silver and ninety-five percent nickel, and ten percent silver-ninety percent nickel have been used successfully for the stationary electrode while fifteen percent silver-eighty-five percent nickel have been unsatisfactory due to visible contamination. The plunger electrode is subject to less severe conditions and a composition of fifteen percent silver-eighty-five percent nickel has been found to produce less arcing tendency than the compositions containing smaller amounts of silver and it does not produce visible contamination on the frankfurter.

In the specific arrangement disclosed in the drawings, the movable electrode 19 is molded to the shape required, while stationary the electrode 17 is machined to the required diameter from a standard blank. The electrodes are produced by conventional procedure, and may vary over a range of porosity and density. The compacts preferred for high production rates may have a density relative to the corresponding solid alloy of the same proportional composition, from 86.6 percent to 93.4 percent. Similarly, the porosity will vary from 13.4 percent to 6.6 percent of the bulk of the sintered material. A representative example giving very satisfactory operating characteristics for the stationary electrode was composed of 10 percent silver, remainder nickel, processed to a density of 93.4 percent (8.45 g./cm.$^3$) with a porosity of 6.6 percent. This electrode was used with a movable electrode of 15 percent silver, remainder nickel, with a density of 87.0 percent (7.94 g./cm.$^3$) and 13.0 percent porosity. The density and porosity figures given are calculated from measurements of gross density, taking the density of nickel and silver as 8.90 g./cm.$^3$ and 10.50 g./cm.$^3$ respectively, and assuming alloy formation without volume change. In general, the lower density compacts exhibit less tendency to arc, but erode more rapidly. Porosities in the range from 5 to 15 percent are preferred, but operating design requirements may be met over a wider range covering lower and higher values.

The electrode composition of this invention has been described in its application to a frankfurter cooking machine to provide a specific illustration of the severe service conditions and high voltage requirements for rapid cooking of food products. It is recognized that the electrode composition of this invention may be used in other food cooking apparatus where contamination or arcing are to be avoided, and variations and changes may be made in the invention as described in this specification without departing from the invention as set forth in the claim.

I claim:

The method of resistance heating raw meat emulsion comprising discharging high voltage current from a contamination resistant sintered silver-nickel compact having arcing avoidant characteristics in which the silver content is from 5 to 15 percent, the nickel content is from 85 to 95 percent, and which have a porosity from 5 to 15 percent, into raw meat emulsion abutted thereagainst.

References Cited by the Examiner

UNITED STATES PATENTS

| 2,833,847 | 5/58 | Saluaze | 29—182 |
| 2,877,118 | 3/59 | Hensgen et al. | 99—358 |
| 3,042,747 | 7/62 | Aurand et al. | 75—170 |
| 3,122,989 | 3/64 | Clemens et al. | 99—358 |

FOREIGN PATENTS 700,658  12/53  Great Britain.

OTHER REFERENCES

"Contribution a l'etude des alliages de nickel et d'argent"; by E. Vigoroux, No. 107, Bulletin, Societe Chimique de France, 4th Serie Tome 7, 1910, Memoires, pp. 621–622.

Silver in Industry, Addick, L., Copyright 1940, publ. by Reinhold Publishing Corp., 330 W. 42nd Street, New York, page 198, paragraphs 2 and 3 relied upon.

DAVID L. RECK, *Primary Examiner.*

RAY K. WINDHAM, WINSTON L. DOUGLAS,
*Examiners.*